United States Patent
Elfizy et al.

(10) Patent No.: US 10,252,382 B2
(45) Date of Patent: Apr. 9, 2019

(54) METHOD OF MACHINING SURFACES OF ROTOR DISC AND GRINDING MACHINE THEREFOR

(71) Applicant: Pratt & Whitney Canada Corp., Longueuil (CA)

(72) Inventors: Amr Elfizy, Saint-Basile-le-Grand (CA); Lafleche Gagnon, Sainte-Julie (CA); Sylvain Jette, St-Lambert (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 368 days.

(21) Appl. No.: 15/175,369

(22) Filed: Jun. 7, 2016

(65) Prior Publication Data

US 2016/0288274 A1    Oct. 6, 2016

Related U.S. Application Data

(62) Division of application No. 13/463,476, filed on May 3, 2012, now Pat. No. 9,381,615.

(51) Int. Cl.
*B23P 15/04* (2006.01)
*B24B 19/26* (2006.01)
(Continued)

(52) U.S. Cl.
CPC .............. *B23P 15/04* (2013.01); *B24B 5/02* (2013.01); *B24B 5/04* (2013.01); *B24B 5/14* (2013.01); *B24B 19/009* (2013.01); *B24B 19/26* (2013.01); *B24B 27/0084* (2013.01); *B24B 41/005* (2013.01); *B24D 5/02* (2013.01); *B24D 7/02* (2013.01); *B24D 7/18* (2013.01);
(Continued)

(58) Field of Classification Search
CPC ... B23P 15/04; B24B 5/04; B24B 5/02; B24B 5/14; B24B 19/26; B24B 41/005; B24B 27/0084; B24B 19/009; B24B 27/0007; B24D 7/18; B24D 5/02; B24D 7/02; F05D 2230/10
See application file for complete search history.

(56) References Cited

U.S. PATENT DOCUMENTS 4,513,540 A      4/1985  Dzewaltowski et al.
4,621,407 A  *  11/1986  Suzuki ................... B23Q 1/015
                                                      29/26 A
(Continued)

*Primary Examiner* — Ryan J. Walters
(74) *Attorney, Agent, or Firm* — Norton Rose Fulbright Canada LLP

(57) ABSTRACT

A grinding machine for finishing turned surfaces of a rotor disc for a gas turbine engine, including a retaining mechanism for retaining the rotor disc and rotatable about a rotational axis corresponding to a central axis of the rotor disc, a spindle engaged to a grinding wheel and rotatable about a rotational axis corresponding to a central axis of the grinding wheel, the grinding wheel having an outer super abrasive surface, a translating mechanism engaged to at least one of the retaining mechanism and the spindle and actuable to provide a relative translational motion between the retaining mechanism and the spindle along three perpendicular axes, and a pivoting mechanism engaged to one of the retaining mechanism and the spindle and actuable to provide a pivoting motion of the rotational axis of one of the retaining mechanism and the spindle around a pivot axis perpendicular thereto.

11 Claims, 8 Drawing Sheets

(51) Int. Cl.
  *B24B 5/14* (2006.01)
  *B24B 5/04* (2006.01)
  *B24B 5/02* (2006.01)
  *B24B 19/00* (2006.01)
  *B24B 27/00* (2006.01)
  *B24B 41/00* (2006.01)
  *B24D 5/02* (2006.01)
  *B24D 7/02* (2006.01)
  *B24D 7/18* (2006.01)

(52) U.S. Cl.
  CPC ...... *B24B 27/0007* (2013.01); *F05D 2230/10* (2013.01); *Y10T 29/37* (2015.01); *Y10T 29/4932* (2015.01); *Y10T 29/49325* (2015.01); *Y10T 29/5177* (2015.01)

(56) References Cited

U.S. PATENT DOCUMENTS

| | | |
|---|---|---|
| 7,264,538 B2 | 9/2007 | Hood et al. |
| 7,303,461 B1 | 12/2007 | Campomanes et al. |
| 7,462,144 B2 * | 12/2008 | Braun ............... B23Q 3/15706 483/23 |
| 7,708,619 B2 | 5/2010 | Subramanian et al. |
| 7,833,086 B2 | 11/2010 | Mielke |
| 2003/0024825 A1 | 2/2003 | Lamphere et al. |
| 2009/0060663 A1 | 3/2009 | Rouge et al. |
| 2009/0291622 A1 | 11/2009 | Butler et al. |
| 2010/0112910 A1 * | 5/2010 | Brown .................... B24B 9/10 451/44 |

* cited by examiner

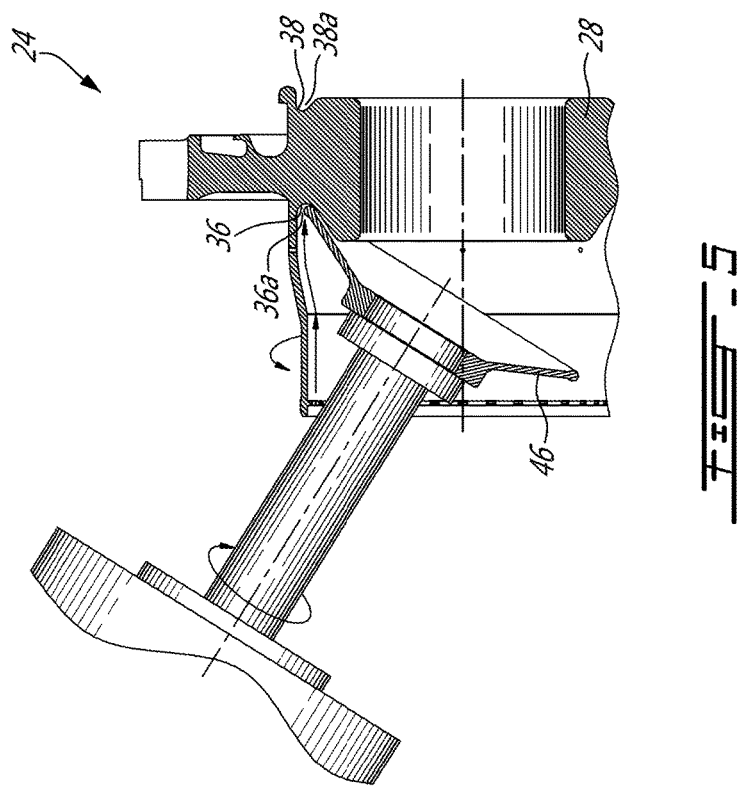
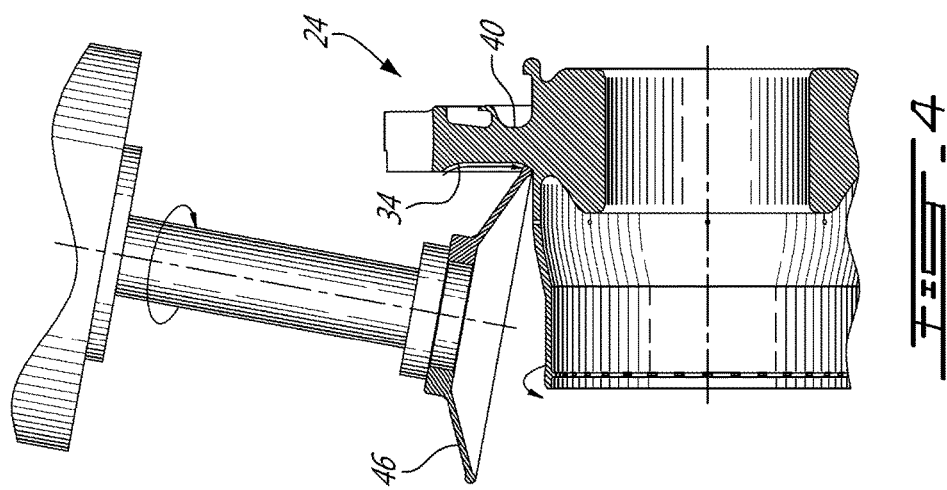

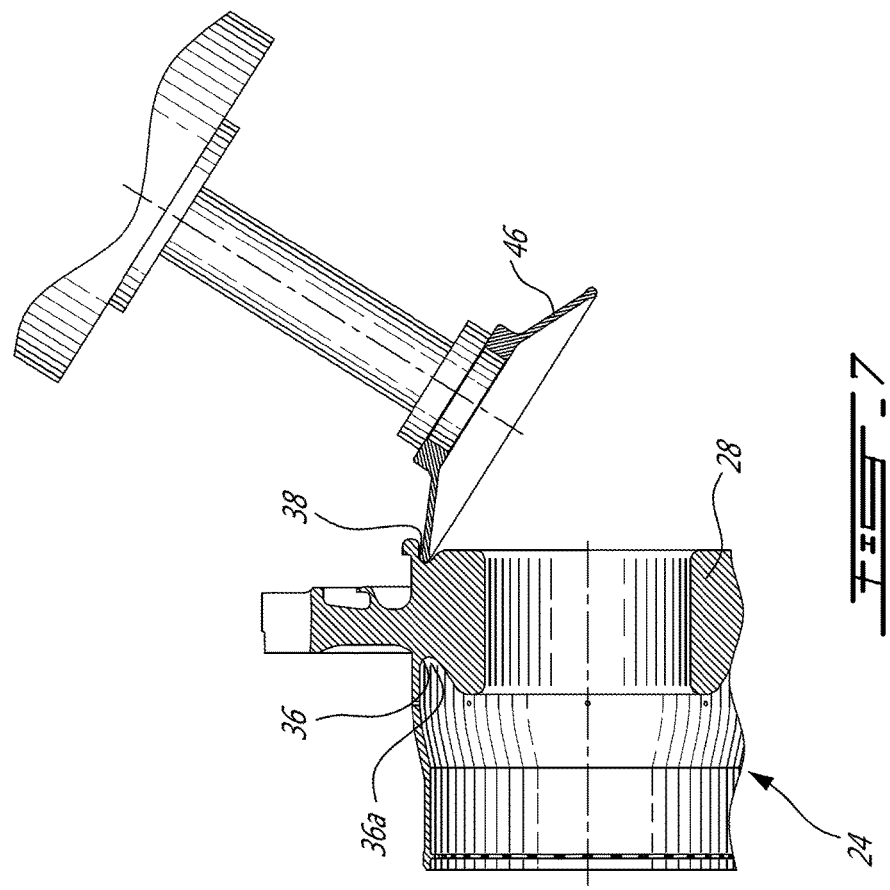
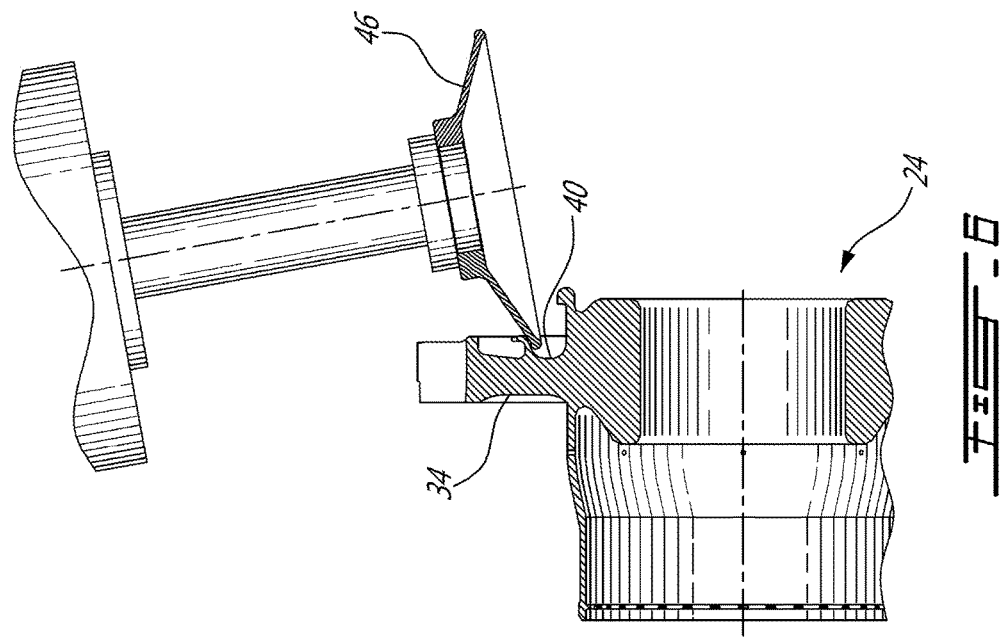

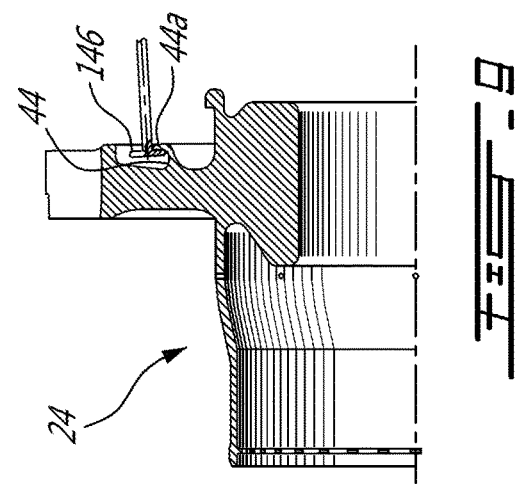
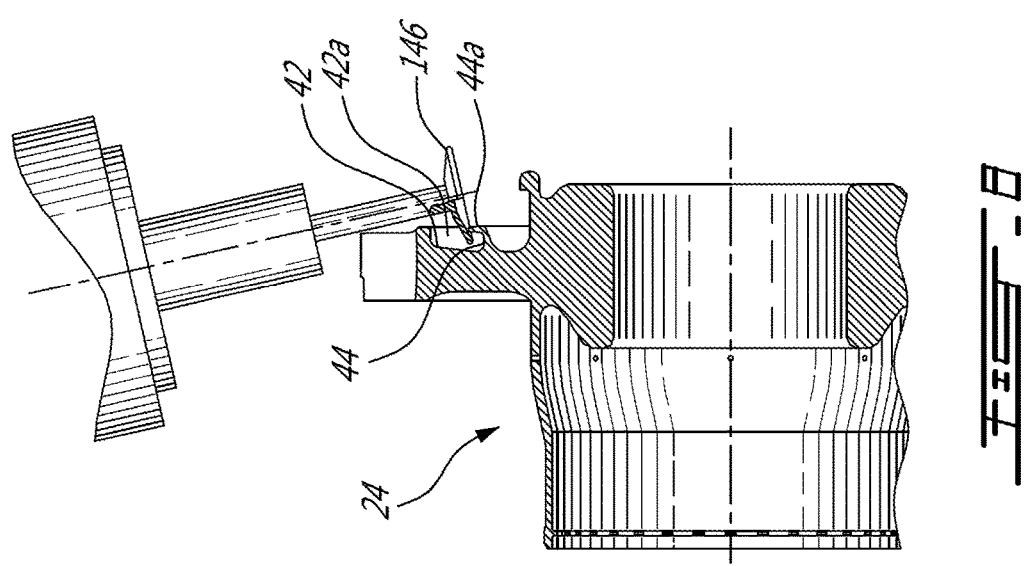

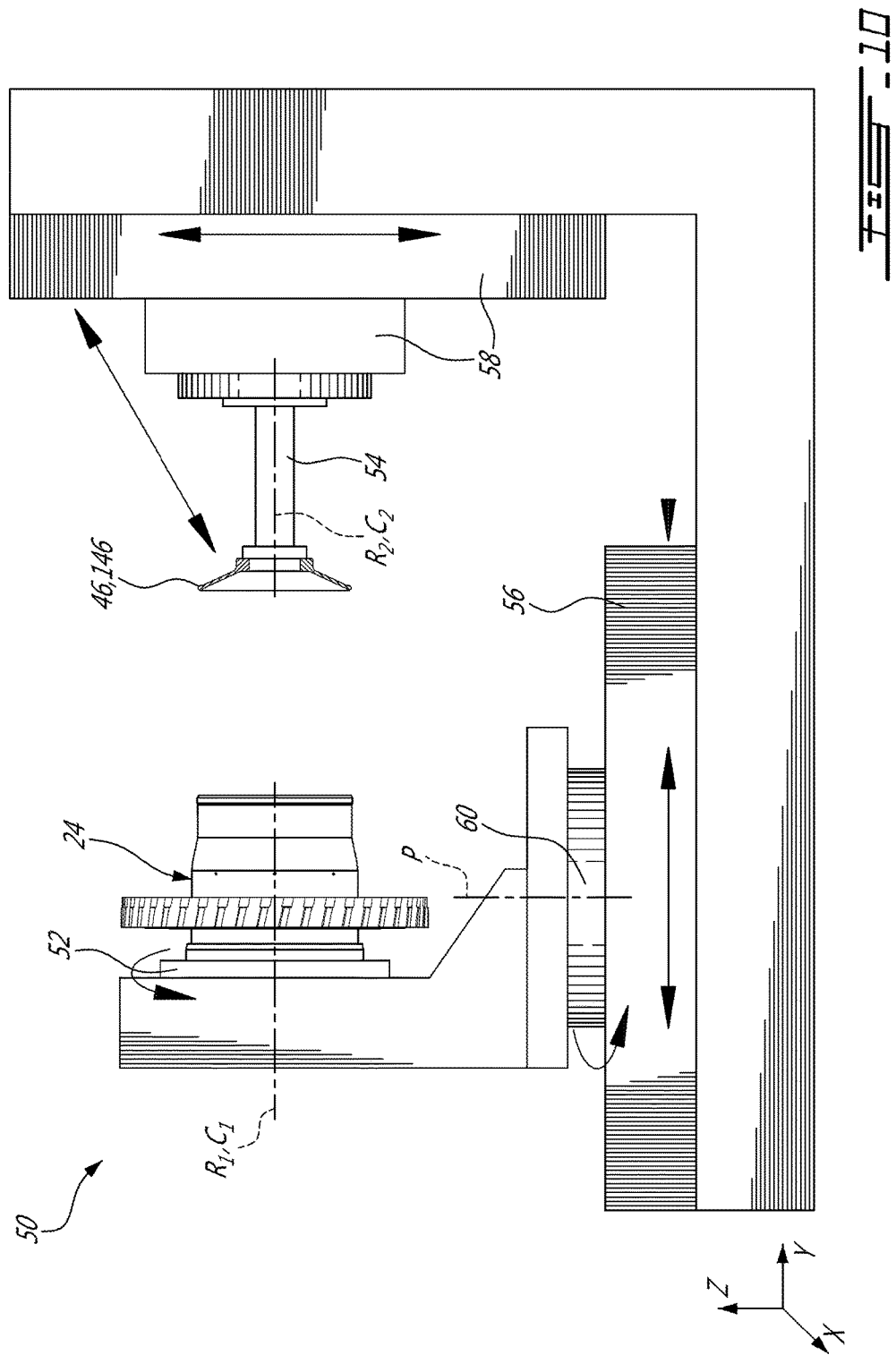

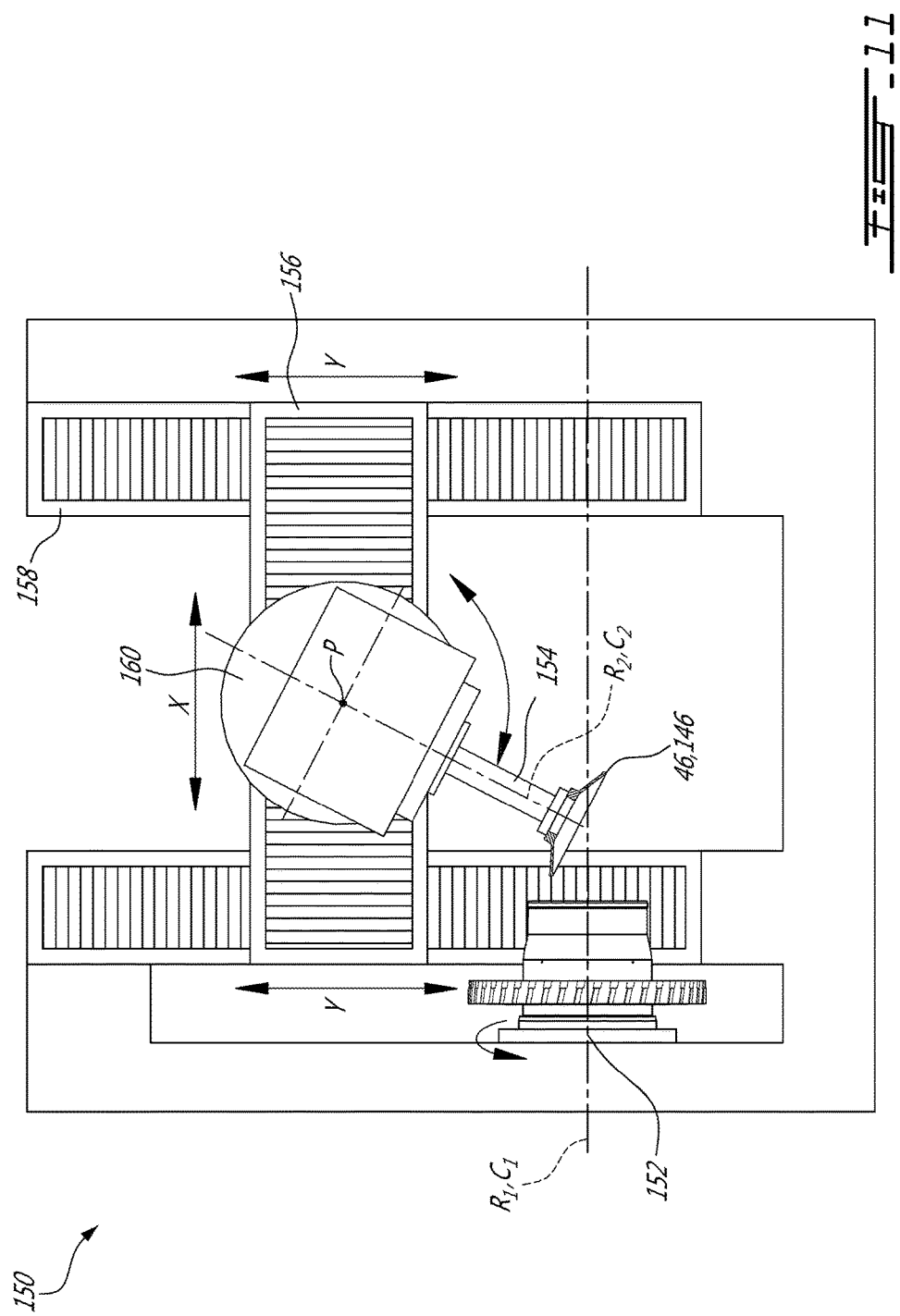

METHOD OF MACHINING SURFACES OF ROTOR DISC AND GRINDING MACHINE THEREFOR

CROSS-REFERENCE TO RELATED APPLICATIONS

This application is a divisional of U.S. application Ser. No. 13/463,476 filed May 3, 2012, the entire contents of which are incorporated by reference herein.

TECHNICAL FIELD

The application relates generally to rotor discs for gas turbine engines and, more particularly, to the machining of such discs.

BACKGROUND OF THE ART

Rotors of gas turbine engines such as turbine rotors, compressor impeller rotors, rotors with separate or with integral blades, etc., typically have a rotor disc (whether integral with or separately manufactured from the blades) with turned surfaces. Such turned surfaces, and particularly those having a curved cross-sectional profiles, are typically machined by a turning method where the rotating rotor disc is put into contact with a stationary or translating point tool grinding the surface to the desired profile.

Improvements in fuel efficiency lead to gas turbine engines being run at higher temperatures. As such, harder materials are used to form the parts of the gas turbine engines. Such materials having high temperature strength and hardness are more difficult to machine. The resistance of these materials can be such as to produce, for example, excessive wear of the point tools, breakage of the point tool tips, chipping of the point tools, reduced machining speeds, and/or damaged workpiece surfaces.

SUMMARY

In one aspect, there is provided a method of manufacturing turned surfaces of a rotor disc of a gas turbine engine, the method comprising: rotating the rotor disc about a central axis thereof; rotating an abrasive grinding wheel, the abrasive grinding wheel having an outer grinding surface with a hardness greater than that of a material of the rotor disc; contacting the rotating wheel with at least one annular surface of the rotating disc; and sliding the rotating wheel along a curved cross-sectional profile of the at least one annular surface of the rotating disc.

In another aspect, there is provided a method of finishing all turned surfaces having a curved cross-sectional profile in a rotor disc of a gas turbine engine, the method comprising: retaining the rotor disc in a retaining mechanism; rotating the rotor disc about a central axis thereof with the retaining mechanism; and while rotating the rotor disc, sliding at least one rotating grinding wheel having a hardness greater than that of a material of the rotor disc along the cross-sectional profile of each of the turned surfaces having a curved cross-sectional profile without disengaging the rotating rotor disc from the retaining mechanism In a further aspect, there is provided a grinding machine for finishing turned surfaces of a rotor disc for a gas turbine engine, the machine comprising: a retaining mechanism configured for retaining the rotor disc, the retaining mechanism being rotatable about a rotational axis corresponding to a central axis of the rotor disc; a spindle engaged to a grinding wheel, the spindle being rotatable about a rotational axis corresponding to a central axis of the grinding wheel, the grinding wheel having an outer super abrasive surface; a translating mechanism engaged to at least one of the retaining mechanism and the spindle, the translating mechanism being actuable to provide a relative translational motion between the retaining mechanism and the spindle along three perpendicular axes; and a pivoting mechanism engaged to one of the retaining mechanism and the spindle, the pivoting mechanism being actuable to provide a pivoting motion of the rotational axis of one of the retaining mechanism and the spindle around a pivot axis perpendicular thereto.

DESCRIPTION OF THE DRAWINGS

Reference is now made to the accompanying figures in which:

FIG. 4 is a partial schematic cross-sectional view of the rotor disc of FIG. 3 having a curved annular surface of a face profile being machined with the grinding wheel;

FIG. 5 is a partial schematic cross-sectional view of the rotor disc of FIG. 3 having a curved surface of a pocket profile being machined with the grinding wheel;

FIG. 6 is a partial schematic cross-sectional view of the rotor disc of FIG. 3 having a curved annular surface of another face profile being machined with the grinding wheel;

FIG. 7 is a partial schematic cross-sectional view of the rotor disc of FIG. 3 having a curved surface of another pocket profile being machined with the grinding wheel;

FIG. 8 is a partial schematic cross-sectional view of the rotor disc of FIG. 3 having a curved surface of an annular groove being machined with a smaller grinding wheel;

FIG. 9 is a partial schematic cross-sectional view of the rotor disc of FIG. 3 having a curved surface of an annular lip being machined with the smaller grinding wheel;

FIG. 10 is a schematic front view of a grinding machine which can be used to machine the turned surfaces of a rotor disc such as shown in FIG. 3; and FIG. 11 is a schematic top view of another grinding machine which can be used to machine the turned surfaces of a rotor disc such as shown in FIG. 3.

DETAILED DESCRIPTION

Figure 1:
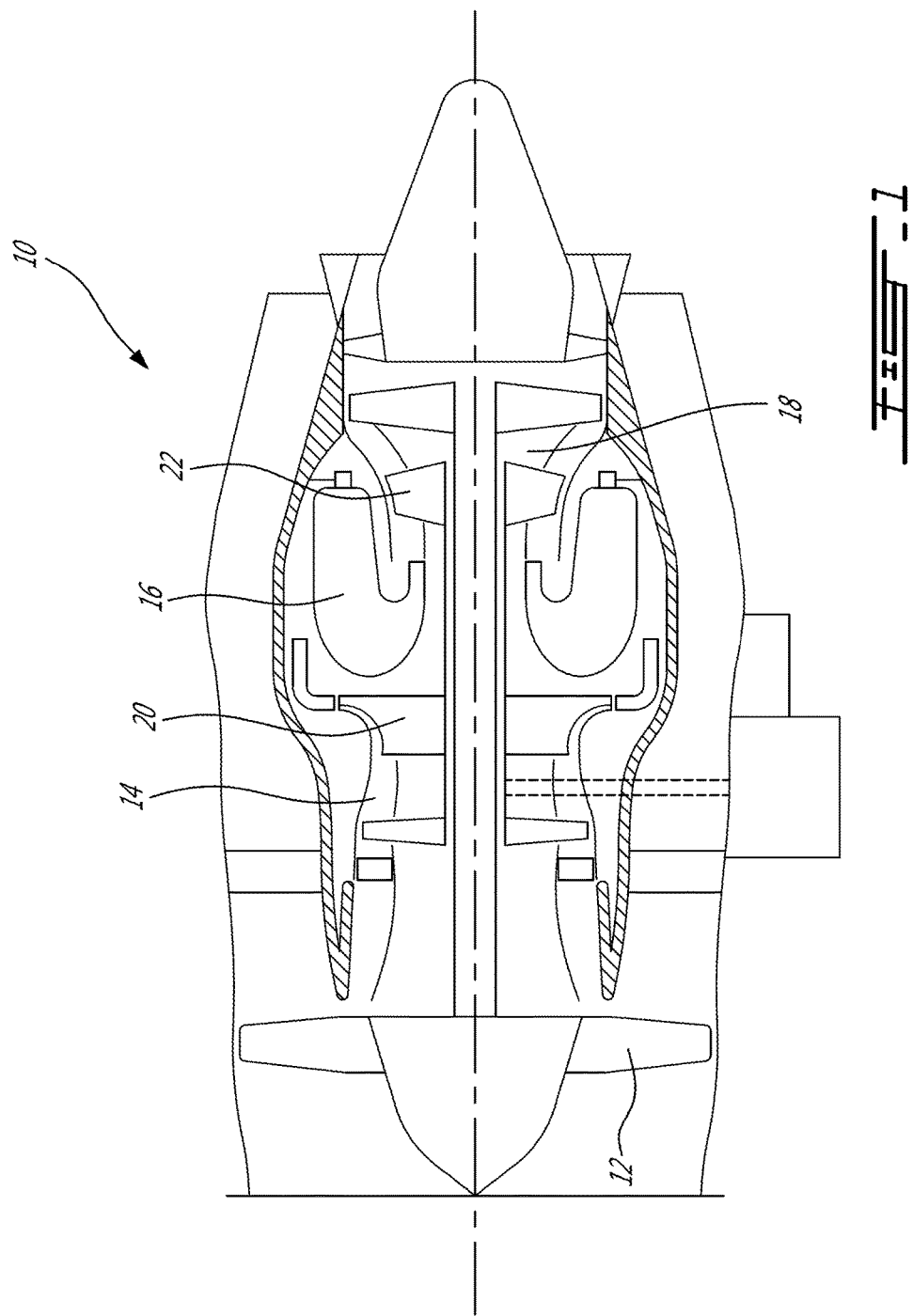
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a plurality of rotors, such as for example a high pressure compressor impeller rotor 20 in the compressor section 14 and a high pressure turbine rotor 22 in the turbine section 18. Although the gas turbine 10 is shown here as a turbofan, the engine can be any other type of gas turbine engine, for example turboshaft engines and turboprop engines.

Figure 3:
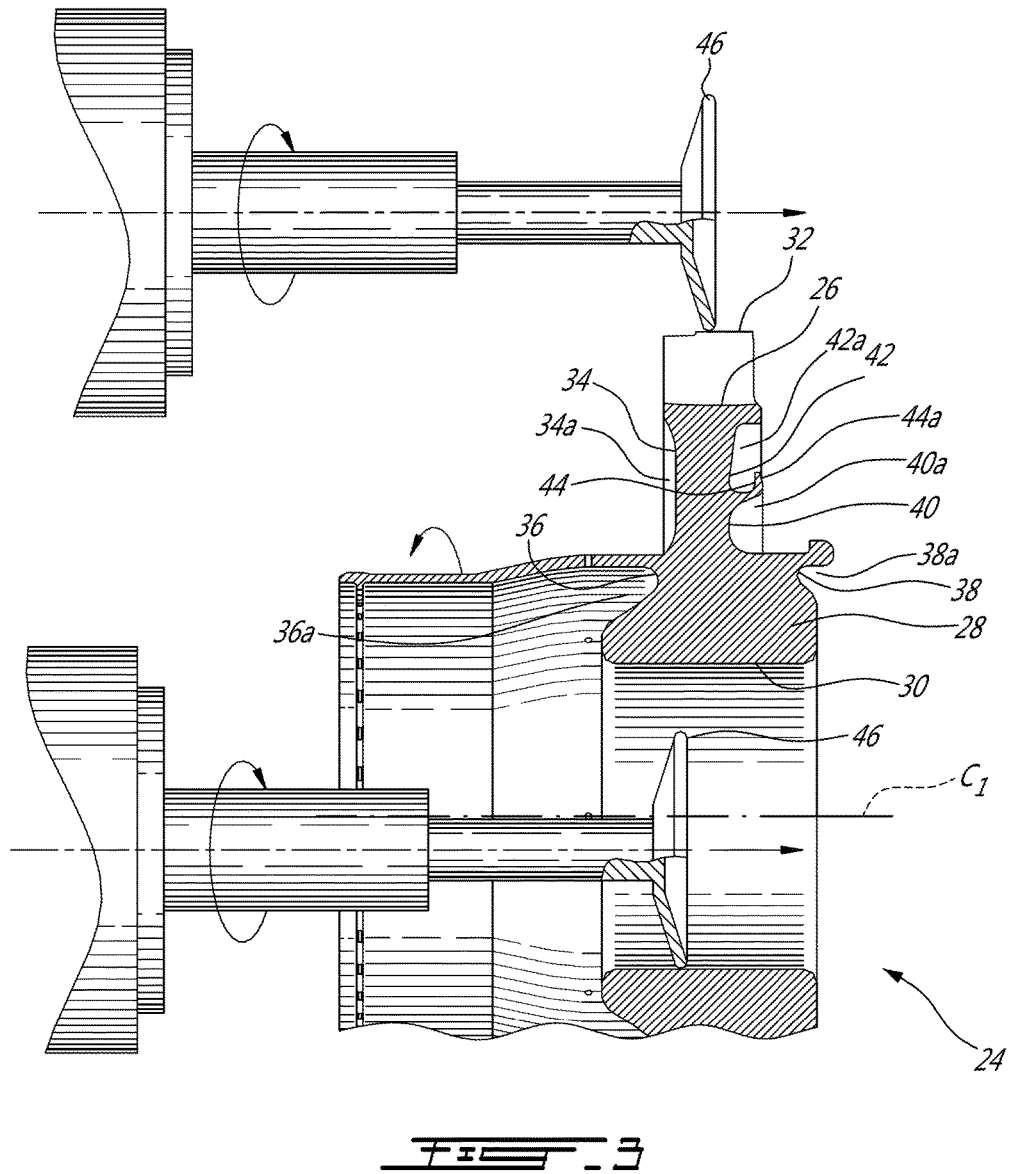
FIG. 3 is a partial schematic cross-sectional view of a rotor disc which can be used in a gas turbine engine such as shown in FIG. 1, having internal and external axial surfaces being machined using a grinding wheel such as shown in FIGS. 2a-2b.

Referring to FIG. 3, a rotor disc 24 is partially shown. In the embodiment shown, the disc 24 includes blade slots 26 each sized to receive the root of a blade therein (not shown). In another embodiment, the rotor disc 24 is part of an integrally bladed rotor, i.e. where the rotor and the blades are machined as one piece.

In a particular embodiment, the rotor disc 24 is made of a material having a hardness of at least 50 HRC (Rockwell scale C). In a particular embodiment, the rotor disc 24 is made of a material selected from a nickel super alloy, a nickel-based powder metal, a metal matrix composite, and a metal matrix ceramic. Particular examples include, but are not limited to, Direct Aged Inconel 718, IN100 powder nickel alloy and ME16 powder nickel alloy.

The rotor disc 24 includes a plurality of turned surfaces, i.e. annular surfaces which have a constant cross-sectional profile around the circumference of the disc 24 and as such can be machined by a turning method. The rotor disc 24 includes a hub 28 defining an annular internal surface 30 which extends axially, i.e. parallel to the central axis $C_1$ of the rotor disc. The rotor disc 24 also includes an annular external surface 32 in which the blade slots 26 are defined, which also extends axially.

The turned surfaces also include a plurality of surfaces which have a curved cross-sectional profile, viewed as a curve in a cross-section such as that of FIG. 3. A curved turned surface 34 is defined by the face profile of one side of the rotor disc 24, defining a first annular recess 34a in that side, extending substantially from the hub 28 to the blade slots 26. Other curved turned surfaces 36, 38 are defined by annular pockets 36a, 38a on each side of the hub 28. Another curved turned surface 40 is defined by the face profile of the opposite side of the rotor disc 24, defining an annular recess 40a in that side extending adjacent the hub 28. An annular groove 42a is defined radially outwardly from the second annular recess 40a, and is separated therefrom by a lip 44a. The annular groove 42a and lip 44a also define annular surfaces 42, 44 having curved cross-sectional profiles. In addition to or in replacement to some or to all of the above describes surfaces, the rotor may include other curved turned surfaces resulting from other face profiling, pocketing, grooving, etc.

As shown in FIG. 3, the axial annular internal and external surfaces 30, 32 may be machined by a wheel turn grinding method, through sliding engagement with an abrasive wheel 46. Referring to FIGS. 4-9, instead of being conventionally turned with a point tool, at least one of the curved turned surfaces 34, 36, 38, 40, 42, 44, on which prior machining steps may have been performed, is finished by turning using a grinding wheel 46, 146. More than one grinding wheel 46, 146 can be used, with the wheel(s) being designed to insure accurate machining of the corresponding part features and at the same time avoid collision and interference with the remainder of the disc.

Each grinding wheel 46, 146 has a hardness which is greater than that of the material of the rotor disc 24. In a particular embodiment, the grinding wheel(s) 46, 146 are super abrasive wheels including an outer super abrasive surface such as a plated, brazed or vitrified layer with cubic Boron Nitride (cBN) grits, or a plated or brazed layer with diamond grits. The core material of the grinding wheel(s) 46, 146 may vary, and include for example aluminium for lower rotational speeds and steel, titanium or carbon fiber for higher rotational speeds.

Turn grinding wheels 46, 146 are positioned and continuously fed accurately along the workpiece surface. Referring to FIG. 10, an exemplary 5-axis turn grinding machine 50 is shown, similar to a milling machine. The disc 24 is installed on a retaining mechanism 52 which retains the disc 24 in position and rotates it about a rotational axis $R_1$ corresponding to the central axis $C_1$ of the disc 24. The machine 50 also includes a spindle 54 to which is interchangeably engaged each grinding wheel 46, 146, and which is rotatable about a rotational axis $R_2$ corresponding to the central axis $C_2$ of the grinding wheel 46, 146. A translating mechanism includes a first portion 56 engaged to the retaining mechanism 52 to slide it along a Z-axis, and a second portion 58 engaged to the spindle to slide it along X and Y axes; the translating mechanism thus provides a relative translational motion between the retaining mechanism 52 and the spindle 54 along the three perpendicular axes X, Y and Z. A pivoting mechanism 60 is engaged to the retaining mechanism 52 and pivots its rotational axis $R_1$ around a pivot axis P perpendicular thereto.

Referring to FIG. 11, another exemplary 5-axis turn grinding machine 150 is shown, similar to a turning machine or lathe. The disc 24 is installed on a retaining mechanism 152 which retains the disc 24 in position and rotates it about a rotational axis $R_1$ corresponding to the central axis $C_1$ of the disc 24. The machine 150 also includes a spindle 154 to which is interchangeably engaged each grinding wheel 46, 146, and which is rotatable about a rotational axis $R_2$ corresponding to the central axis $C_2$ of the grinding wheel 46, 146. A translating mechanism is engaged to the spindle 154 to slide it along X and Y axes, including a linear X drive 156 received on a double linear Y drive 158. The translating mechanism includes a portion engaged to either the spindle 154 or the retaining mechanism 152 to slide it along the z-axis. A pivoting mechanism 160 is engaged to the spindle 154 and provides a pivoting motion of its rotational axis $R_2$ around a pivot axis P perpendicular thereto.

Other configurations for the grinding machine 50, 150 are also possible.

Figure 2:
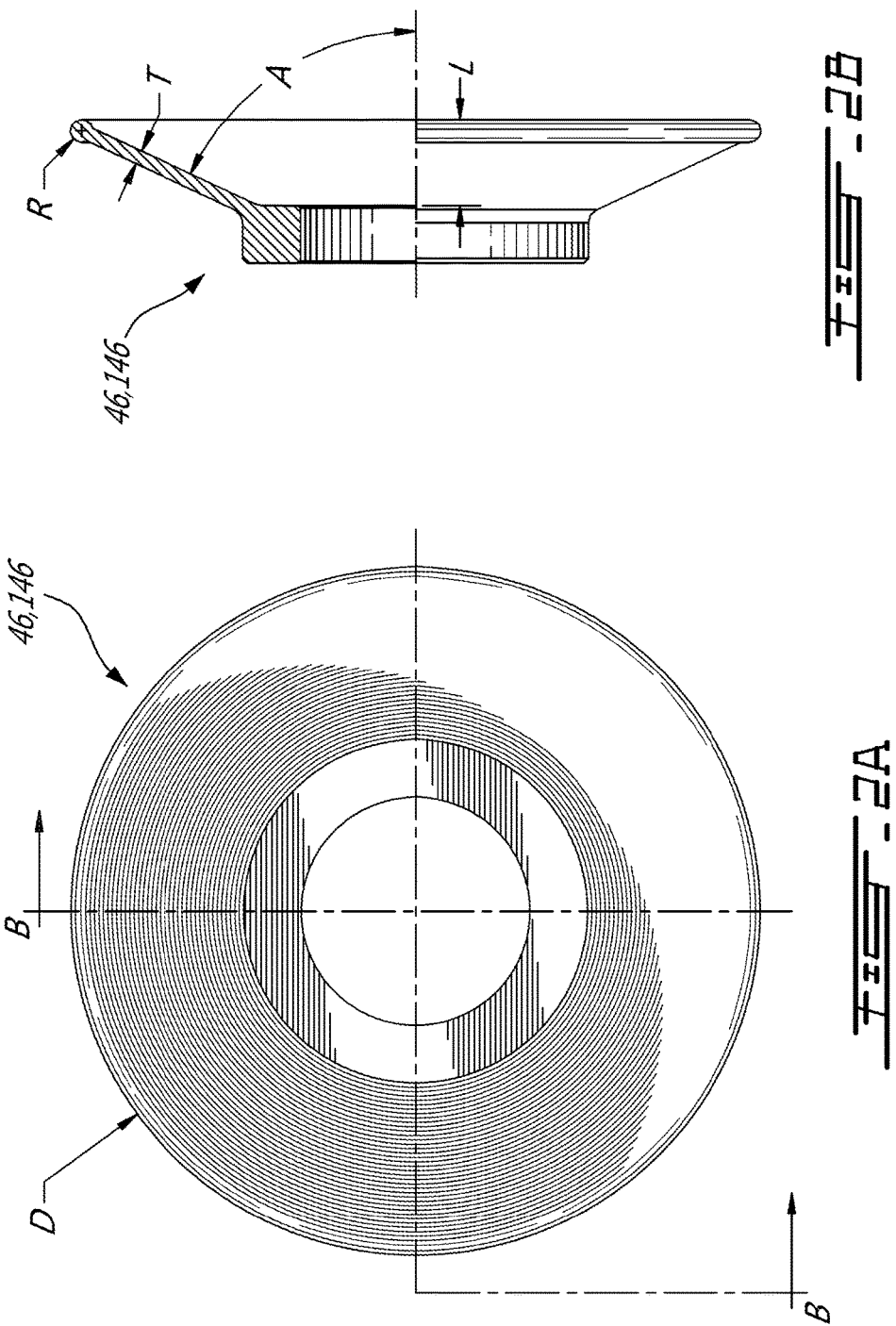
FIG. 2a is a schematic front view of a grinding wheel.
FIG. 2b is a schematic front cross-sectional view of the grinding wheel of FIG. 2a, taken along line B-B thereof.

Referring to FIGS. 2a-2b, each wheel is defined with a particular wheel diameter D, wheel tip radius R, wheel taper angle A, wheel taper length L and wheel web thickness T. These wheel parameters are determined based on the required geometrical feature(s) of the surface to be machined and the accessibility limits to that surface. The geometrical feature(s) and accessibility limits also determine how the wheel 46, 146 is moved and the relative orientation between the wheel 46, 146 and the rotor disc 24. Wheel extensions (not shown) can be used to increase the wheel reach and avoid collision. The wheel taper angle A and length L can be adjusted to avoid interference with adjacent portions of the disc 24. The wheel tip radius R can be selected to match the required final fillet radii on the finished disc 24.

In use, curved turned surfaces of the rotor disc 24 are thus machined or finished by engaging the rotor disc 24 in a retaining mechanism 52, 152 of a grinding machine 50, 150 such as for example one of the machines of FIGS. 10-11. The rotor disc 24 is rotated about its central axis $C_1$ by the retaining mechanism 52, 152. The abrasive grinding wheel 46, 146 of the grinding machine 50, 150 is rotated. The rotating wheel 46, 146 is put in contact with each curved turned surface 34, 36, 38, 40, 42, 44 being machined, and slides along the curved cross-sectional profile of the surface.

The relative orientation between the wheel 46, 146 and the disc 24 may be varied as the wheel slides along the cross-sectional profile and/or between the machining of two different surfaces, as required.

For example, FIGS. 4 and 6 show the use of a grinding wheel 46 to machine the curved turned surface 34, 40 defined by the face profile of the opposed sides of the rotor disc 24. The relative motion between the rotating wheel 46 and rotor disc 24 is controlled such that the wheel 46 follows the corresponding face profile of the disc 24. The wheel tip location and relative orientation between the wheel and rotor disc are controlled to avoid interference or collision with the remainder of the disc 24. The wheel geometry is also selected to allow access to the complete profile of the curved surfaces 34, 40, and may also be defined to correspond to geometrical features such as fillet radii and depths in the face profile.

FIGS. 5 and 7 shows the use of the grinding wheel 46 to machine the curved turned surfaces 36, 38 defined by the pockets 36a, 38a on the opposed sides of the disc hub 28. The wheel geometry may be adapted to efficiently reach the tough pocket areas which might represent a challenge for conventional turning methods using a point tool.

In the embodiment shown, the same grinding wheel 46 is used to machine the curved turned surfaces 34, 36, 38, 40 of FIGS. 4-7; in another embodiment, different wheels are used to machine at least some of the curved turned surfaces.

FIG. 8 shows the use of a smaller grinding wheel 146 to machine the curved turned surface 42 of the annular groove 42a in one face of the rotor disc. FIG. 9 shows the use of the grinding wheel 146 to machine the inner annular surface 44 of the lip 44a bordering the annular groove 42a. Before contacting the rotating wheel 146 with the inner surfaces 42, 44 of the groove 42a and lip 44a, at least part of the rotating wheel 146 is inserted and positioned in the annular groove 42a, and if required behind the annular lip 44a, without contacting the rotor disc 24; the wheel 146 is thus sized according to the size of the groove 42a to be machined. In the embodiment shown, both surfaces 42, 44 are machined using the same grinding wheel 146; in another embodiment, different grinding wheels may be used.

In a particular embodiment, all of the turned surfaces 30, 32, 34, 36, 38, 40, 42, 44 of the rotor disc 24, curved and straight, are machined using one or more grinding wheels 46, 146 in a single machining operation, without disengaging the rotor disc 24 from the retaining mechanism 52, 152 of the grinding machine. In a particular embodiment, the rotor disc 24 continuously rotates during the machining of all the turned surfaces.

During the machining process, the turn grinding wheel 46, 146 and spindle 54, 154 rotate at high speed, for example to provide a wheel surface speed of up to 50000 surface feet per minute (SFM). The wheel surface speed depends on the spindle rotational speed and on the wheel diameter.

The rotor disc 24 may rotate at a lower rotational speed, for example up to 2000 rpm. In a particular embodiment, the rotational speed of the rotor disc 24 is adjusted during the grinding to maintain a same contact surface speed between the rotor disc 24 and the grinding wheel 46, 146 as the rotating wheel 46, 146 slides along the annular surface being machined and/or as the wheel 46, 146 contacts different annular surfaces. Different portions of the rotor disc 24 having different diameters rotate at different surface speeds if the rotational speed remains constant, and adjusting the rotational speed as a function of the diameter of the annular surface being machined allows for the surface speed to remain constant or within a given range.

In the case where the rotor disc 24 includes blade slots 26, the turned surfaces may be machined with the turn grinding wheel(s) 46, 146 either before or after the slots 26 are machined in the rotor disc 24. In a particular embodiment, machining the turned surfaces prior to the blade slots 26 provides datum surface(s) used as reference for the machining of the blade slots 26.

In a particular embodiment, the use of grinding wheels 46, 146 to machine the turned surfaces of the rotor disc 24 provides for a higher quality of the machined surfaces (as opposed to turning with a point tool), which may improve the life of the rotor disc 24. The turn grinding process with grinding wheels is able to machine chips at a higher rate and more efficiently than conventional turning with a point tool, especially for hard materials such as super alloys.

The use of turn grinding wheels 46, 146 when compared to conventional single point tools generally allows for the use of harder cutting edges, an increased number of cutting edges used (along the circumference of the grinding wheel), and faster speeds of the machining operation. Since with turn grinding wheels each pass of the abrasive grit removes only a very small chip load, the machining forces and generated heat are generally limited, which may results in a better surface quality of the machined surface, which in turn may allow for a longer life of the rotor disc.

The above description is meant to be exemplary only, and one skilled in the art will recognize that changes may be made to the embodiments described without departing from the scope of the invention disclosed. For example, the machining operations described may be used with rotor discs having different geometrical features than that shown. Still other modifications which fall within the scope of the present invention will be apparent to those skilled in the art, in light of a review of this disclosure, and such modifications are intended to fall within the appended claims.

The invention claimed is:

1. A grinding machine for finishing turned surfaces of a rotor disc for a gas turbine engine, the grinding machine comprising:

a retaining mechanism configured for retaining the rotor disc, the retaining mechanism being rotatable about a rotational axis corresponding to a central axis of the rotor disc;

a spindle engaged to a grinding wheel, the spindle being rotatable about a rotational axis corresponding to a central axis of the grinding wheel, the grinding wheel having an outer super abrasive surface;

a translating mechanism engaged to at least one of the retaining mechanism and the spindle, the translating mechanism being actuable to provide a relative translational motion between the retaining mechanism and the spindle along three perpendicular axes while the spindle and the retaining mechanism are driven in rotation; and a pivoting mechanism engaged to one of the retaining mechanism and the spindle, the pivoting mechanism being actuable to continuously change an orientation of the retaining mechanism relative to the spindle by providing a pivoting motion of the rotational axis of one of the retaining mechanism and the spindle around a pivot axis perpendicular thereto while the grinding wheel is continuously fed along a curved cross-sectional profile.

2. The machine as defined in claim 1, wherein the spindle is detachably engaged to the grinding wheel and the machine further includes at least one additional grinding wheel interchangeable with the grinding wheel and having a different geometry therefrom.

3. The machine as defined in claim 1, wherein the outer super abrasive surface of the grinding wheel includes carbon boron nitride or diamond grits.

4. The machine as defined in claim 3, wherein the outer super abrasive surface is a plated, brazed or vitrified layer with cubic Boron Nitride grits.

5. The machine as defined in claim 3, wherein the outer super abrasive surface is a plated or brazed layer with diamond grits.

6. The machine as defined in claim 3, wherein the grinding wheel has a core material including one or more of aluminum, steel, titanium and carbon fiber.

7. The machine as defined in claim 1, wherein the translating mechanism includes a first portion engaged to the retaining mechanism and slidable along a first one of the three perpendicular axes, and a second portion engaged to the spindle and slidable along second and third ones of the three perpendicular axes.

8. The machine as defined in claim 1, wherein the pivoting mechanism is engaged to the retaining mechanism and actuable to pivot the rotational axis of the retaining mechanism.

9. The machine as defined in claim 1, wherein the pivoting mechanism is engaged to the spindle and actuable to pivot the rotational axis of the spindle.

10. The machine as defined in claim 1, wherein the translating mechanism is engaged to the spindle and actuable to slide the spindle along first and second ones of the three perpendicular axes, the translating mechanism including a portion engaged to the spindle or to the retaining mechanism and actuable to slide the spindle or the retaining mechanism along a third one of the three perpendicular axes.

11. The machine as defined in claim 1, wherein the translating mechanism includes a first linear drive received on a second linear drive, the first and second linear drives movable along different ones of the three perpendicular axes.

* * * * *